(12) United States Patent
Ogawa

(10) Patent No.: US 7,593,070 B2
(45) Date of Patent: Sep. 22, 2009

(54) OPTICAL UNIT AND LCD DEVICE USING THE OPTICAL UNIT

(75) Inventor: Toshihisa Ogawa, Tokyo (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 0 days.

(21) Appl. No.: 11/984,403

(22) Filed: Nov. 16, 2007

(65) Prior Publication Data
US 2008/0174717 A1    Jul. 24, 2008

Related U.S. Application Data

(62) Division of application No. 10/376,637, filed on Mar. 3, 2003, now Pat. No. 7,301,588.

(30) Foreign Application Priority Data
Mar. 4, 2002  (JP)  ............................. 2002-057275

(51) Int. Cl.
*G02F 1/1333* (2006.01)
(52) U.S. Cl. .......................................... 349/58; 349/65
(58) Field of Classification Search .................. 349/58
See application file for complete search history.

(56) References Cited

U.S. PATENT DOCUMENTS

| 4,789,224 A | 12/1988 | Bougsty |
| 5,886,759 A | 3/1999 | Mashino et al. |
| 6,046,785 A | 4/2000 | Won |
| 6,392,724 B2 | 5/2002 | An et al. |
| 6,626,550 B2 | 9/2003 | Choi |
| 2002/0080298 A1* | 6/2002 | Fukayama ................... 349/58 |

FOREIGN PATENT DOCUMENTS

| JP | 2-138727 | 11/1990 |
| JP | 6-130387 A | 5/1994 |
| JP | 06-242731 | 9/1994 |
| JP | 09-265011 | 10/1997 |
| JP | 09-282919 | 10/1997 |
| JP | 10-068826 | 3/1998 |
| JP | 11-305228 | 11/1999 |
| JP | 2001-091945 | 4/2001 |
| KR | 1 2003-0008790 | 1/2003 |

OTHER PUBLICATIONS

Korean Office Action dated Jan. 29, 2005, with partial English translation.
Taiwan Office Action dated Oct. 4, 2005, with partial English translation.
Japanese Office Action dated Feb. 27, 2007, with partial English translation.

* cited by examiner

*Primary Examiner*—Richard H Kim
(74) *Attorney, Agent, or Firm*—McGinn IP Law Group, PLLC

(57) ABSTRACT

An optical unit, includes a light conductive plate having a first surface and a second surface, at least one optical sheet on the first surface of the light conductive plate, and a light reflective sheet extending over the entire second surface of the light conductive plate and fastened on a portion of a first surface of the optical sheet adjacent the periphery thereof to fasten the light conductive plate, the optical sheet, and the light reflective sheet as an optical unit, and to define a light discharge region on the first surface of the optical sheet and the first surface of the light conductive plate.

12 Claims, 6 Drawing Sheets

OPTICAL UNIT AND LCD DEVICE USING THE OPTICAL UNIT

The present Application is a Divisional Application of U.S. patent application Ser. No. 10/376,637, filed on Mar. 3, 2003 now U.S. Pat. No. 7,301,588.

BACKGROUND OF THE INVENTION

1. Field of the Invention

The present invention relates to an optical unit for use in a liquid crystal display (LCD) device, and to a LCD device incorporating such optical unit.

2. Description of the Related Art

In the field concerning miniaturized LCD devises, use of an optical unit as a built-in backlight has widely spread. Commonly, such optical unit includes a light conductive plate and a source of light, for example, a fluorescent tube or LED. The incident light from the source of light impinges upon the adjacent edge of the light conducive plate. The light diffuses within the light conductive plate. The diffused light illuminates the associated LCD through a planar surface of the light conductive plate. A light reflective sheet covers at least a portion of the light conductive plate to reflect the diffused light back inwardly. This so-called edge type system is advantageous in thinness.

One example of the edge type system is illustrated in FIGS. 11 and 12. FIG. 11 is a plan view of an optical unit 120 according to the prior art with unnecessary sheets removed to illustrate a frame 102. FIG. 12 is a cross section taken through the line 12-12 in FIG. 11. The frame 102 is a rectangular receptacle with a shallow rectangular space. The frame 102 includes four-sided inner peripheral wall and an end wall, which are interconnected to define the shallow rectangular space. As best seen in FIG. 12, the frame 102 receives within the shallow rectangular space a reflective sheet 103 covering the end wall, a light conductive plate 101, and a LED 113. The frame 102 has two positioning grooves 112, with which the opposed sides of the inner peripheral wall are formed, respectively. The light conductive plate 101 has two positioning projections 111 inserted into the positioning grooves 112, respectively. The two projections 111 extend outwardly from sides of the light conductive plate 101. The light conductive plate 101 has a surface covered with a lens sheet 104 and a diffusion sheet 105. The lens sheet 104 extends over almost the entire area of the surface of the light conductive plate 101. The diffusion sheet 105 covers the entire area of the surface of the lens sheet 104. An antiglare sheet 107, which is formed with a rectangular opening, is fast on the frame 102 by adhesive 106 in a manner to cross the boundary between the inner peripheral wall of the frame 102 and the light conductive plate 101 (see FIG. 12).

The market of mobile terminals are growing bigger and bigger. Personal digital assistants (PDA) and mobile telephones constitute the market. In the market, there is strong demand for a reduction in thickness, weight and cost of LCD devices for beneficial application to the PDA and mobile telephones. Accordingly, a need remains for a thin, light and inexpensive optical unit.

The illustrated known optical unit 120 does not meet this need to a satisfactory level. In this known unit, the end wall of the frame 102 plays an important role in retaining an appropriate relationship between the light conductive plate 101 and light reflective plate 103.

With regard to the relationship between a light conductive plate and a frame, JP-A 11-305228 proposes interposing a light conducive plate between a frame and a light reflective sheet and adhering the light reflective plate to the frame. Without the light reflective plate, the light conductive plate would drop out of the frame because it is not held stationary relative to the frame. The light conductive plate is fast on the frame by adhesive only. Thus, there is potential problem that the appropriate positional relationship between the light conductive plate and the frame may not hold if the light conductive plate is stressed against the light reflective sheet.

SUMMARY OF THE INVENTION

An object of the present invention is to provide a thin optical unit, in which a light conductive plate is reliably held in the appropriate positional relationship with the associated element(s).

Another object of the present invention is to provide a LCD device incorporating an optical unit of the above kind.

According to one exemplary implementation of the invention, there is provided an optical unit comprising:
a frame; and
a light conductive plate combined with the frame only to be stationary relative thereto.

According to another exemplary implementation of the present invention, there is provided an optical unit for a liquid crystal display device, comprising:
a light conductive plate;
a source of light arranged to impinge light to an edge of the light conductive plate; and
a retainer, including a light reflective sheet portion, keeping the light conductive plate, the source of light and the light reflective sheet portion in an appropriate positional relationship.

BRIEF DESCRIPTION OF THE DRAWINGS

The present invention will be apparent from the following more particular description of exemplary embodiments of the invention as illustrated in the accompanying drawings. The drawings are not necessarily scale, emphasis instead being placed upon illustrating the principles of the invention.

DESCRIPTION OF THE EXEMPLARY EMBODIMENTS

Figure 1:
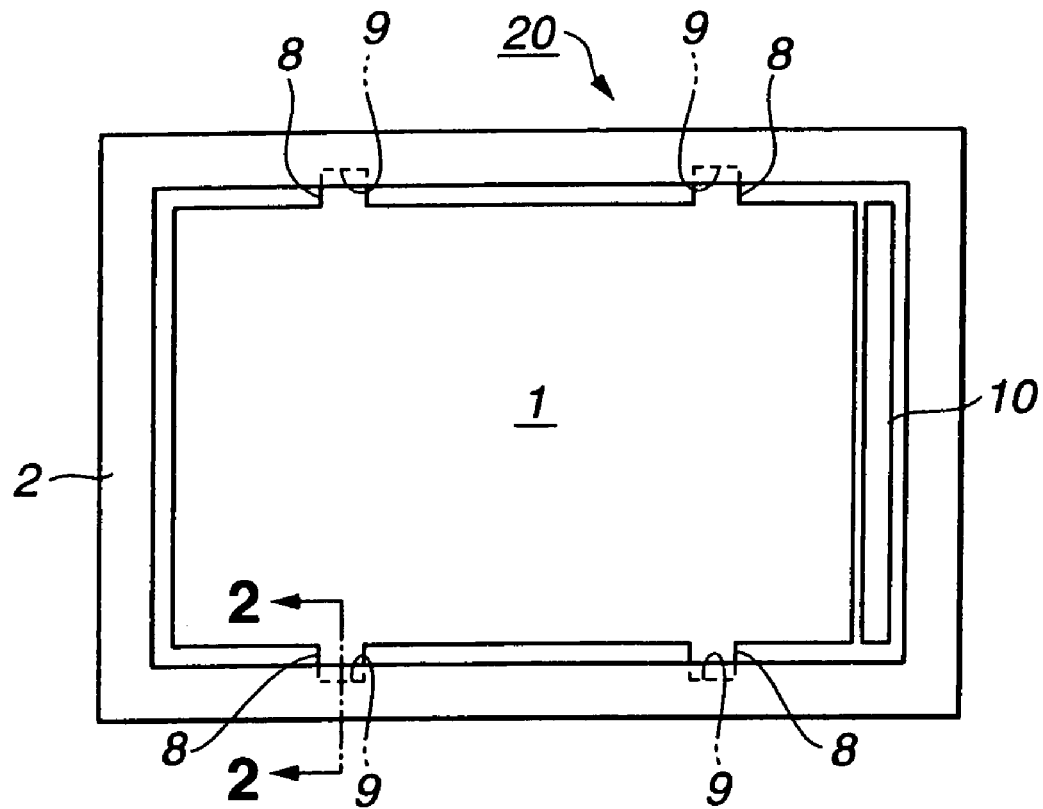
FIG. 1 is a plan view of one exemplary implementation of an optical unit according to the present invention, with unnecessary elements removed to illustrate a frame and a light conductive plate combined with the frame only to be stationary relative thereto.

Referring to the accompanying drawings, like reference numerals are used to designate like parts or portions throughout each view of FIGS. 1 to 10 for the sake of brevity of description.

Figure 2:
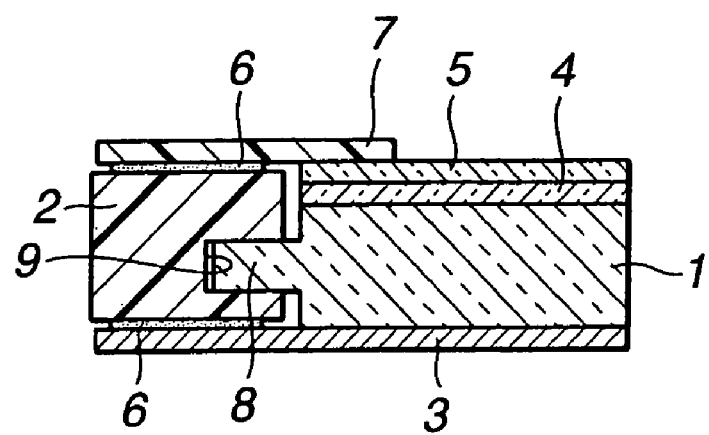
FIG. 2 is a cross section taken through the line 2-2 in FIG. 1.

FIGS. 1 and 2 illustrate one exemplary implementation an optical unit 20 of the present invention. The optical unit 20 includes a light conductive plate 1 and a frame 2. The light conductive plate 2 is rectangular and has four sides. Molding has formed the frame 2. The frame 2 has a rectangular opening and includes four-sided inner peripheral wall defining the rectangular opening.

The light conductive plate 1 is combined with the frame 2 only to be stationary relative to it. In the illustrated optical unit 20, the light conductive plate 1 is held stationary, within the rectangular opening, relative to the frame 2. The light conductive plate 1 has four fixing projections 8, which are inserted into and received by four fixing hollows 9, respectively. The frame 2 is formed with the hollows 9. The four fixing hollows 9 are located in two opposed sides of the inner peripheral wall of the frame 2, two in one of the two opposed sides, the other two in the other side. The four fixing projections 8 are located in two opposite sides of the light conductive plate 1, two in one of the two opposite sides, the other two in the other side. With the fixing hollows 9 receiving the fixing projections 8, the frame 2 retains the light conductive plate 1.

On one of the four sides, the light conductive plate 1 has a light receiving edge positioned near a translucent tube 10. The light conductive plate 1 has a front surface and a rear surface. A light reflective sheet 3 covers the entire area of the rear surface of the light conductive plate 1. At portion near the periphery, the light reflective sheet 3 is fast on one end surface of the frame 2 by adhesive 6, for example, a pressure sensitive adhesive double-coated tape. Optical sheets cover the front surface of the light conductive plate. In the illustrated optical unit 20, a lens sheet 4 covers the entire area of the front surface of the light conductive plate 1, and a diffusion sheet 5 covers the entire area of the surface of the lens sheet 4. An antiglare sheet 7, which is formed with a rectangular opening defining a light discharge region, is fast on the opposite end surface of the frame 2 by adhesive 6 in a manner to cross the boundary between the inner peripheral wall of the frame 2 and the light conductive plate 1. The antiglare sheet 7 keeps the diffusion sheet 5 and lens sheet 4 in appropriate position on the surface of the light conductive plate 1.

From the preceding description on the optical unit 20, it is appreciated that the frame 2 does not require a bottom end wall and retains the light conductive plate 1 by holding the sides of it. Employing the frame 2 without the bottom end wall makes great contribution to a reduction in thickness of the optical unit 20. A reduction in thickness as much as 20% has resulted from comparison of the optical unit 20 with the known optical unit 120.

In addition to coupling between the light conductive plate 1 and the frame 2, the antiglare sheet 7 and the light reflective sheet 3 interpose therebetween the light conductive plate 1 to hold the light conductive plate 1 firmly within the frame 2. This causes an increase in stiffness of the optical unit 20. In other words, the frame 2, light reflective sheet 3 and antiglare sheet 7 cooperate with each other to form a retainer, which can keep the light conductive plate 1 and the associated optical sheets 4 and 5 in the appropriate positional relationship even under external stress. This brings about a reduction in damage on the light conductive plate 1, enhancing reliability of the optical unit 20.

The number of fixing projections 8 and hollows 9 is not limited to four (4). The number may be any appropriate even number that is determined after due consideration of design requirement on the relationship between the light conductive plate 1 and frame 2. For example, the number may be two (2) or six (6).

In the optical unit 20, the light conductive plate 1 has the fixing projections 8, and the frame 2 has the fixing hollows 9. The present invention is not limited to this example. The fixing projections may belong to the frame, and the fixing hollows to the light conductive plate.

Figure 3:
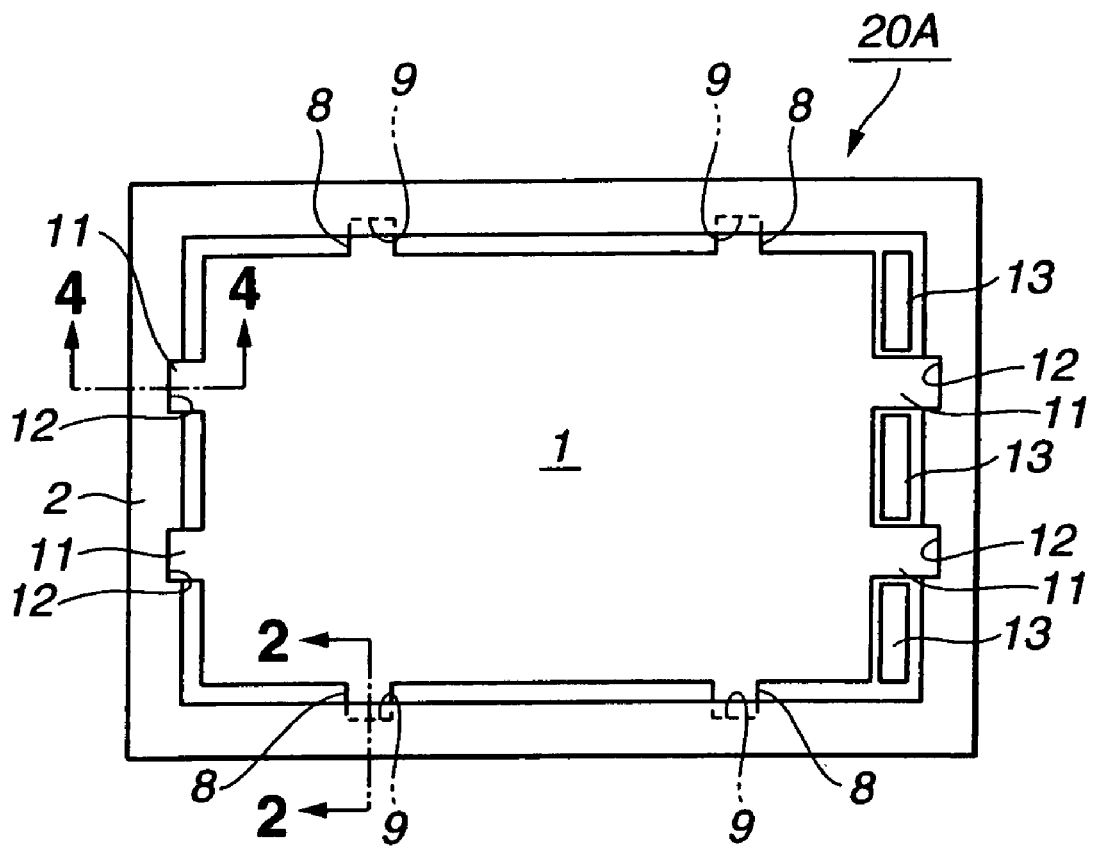
FIG. 3 is a similar to FIG. 1, illustrating a modification of the exemplary implementation.
Figure 4:
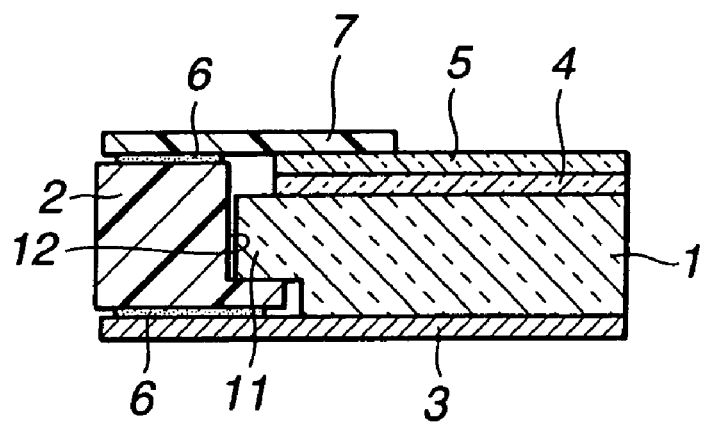
FIG. 4 is a cross section taken through the line 4-4 in FIG. 3.

FIGS. 3 and 4 illustrate a modification. A modified optical unit is generally indicated at 20A. The optical unit 20A is substantially the same as the previously described optical unit 20. However, the optical unit 20A is different from the optical unit 20 in the provision of positioning projections 11 and positioning grooves 12. A frame 2 has four positioning grooves 12, two on one of two opposed sides of the inner peripheral wall, the other two on the other side. These two opposed sides are free from the fixing hollows 9. A light conductive plate 1 has four positioning projections 11 inserted into and received by the positioning grooves 12, respectively. The two of the four positioning projections 11 extend outwardly from one of two opposite sides, and the other two positioning projections 11 from the other side. These opposite sides are free from the fixing projections 8. Another difference resides in the use of LED 13 as a source of light instead of the fluorescent tube 10.

In the modified optical unit 20A, the positioning work of the light conductive plate 1 becomes easy due to the provision of the positioning projections 11 and grooves 12.

Figure 5:
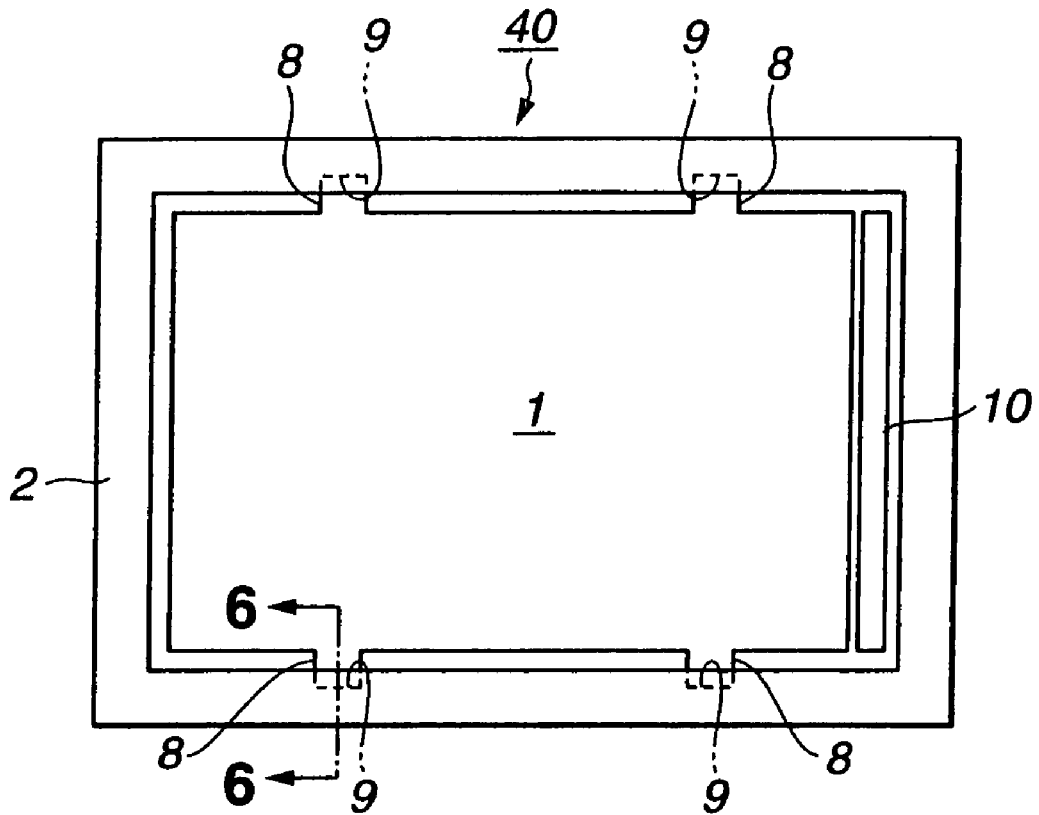
FIG. 5 is a plan view of another exemplary implementation of an optical unit according to the present invention, with unnecessary elements removed to illustrate a frame and a light conductive plate combined with the frame only to be stationary relative thereto.
Figure 6:
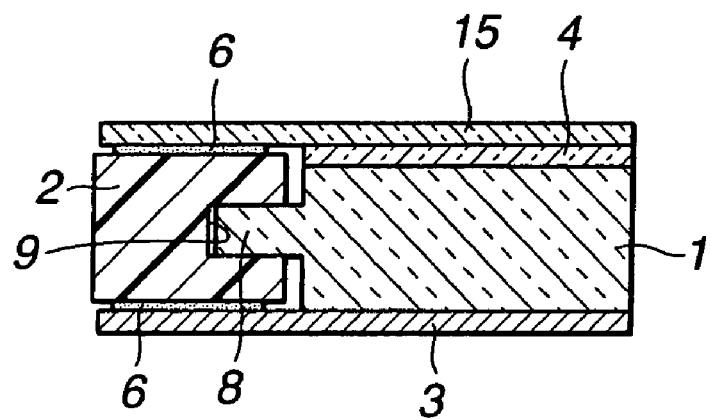
FIG. 6 is a cross section taken through the line 6-6 in FIG. 5.
Figure 7:
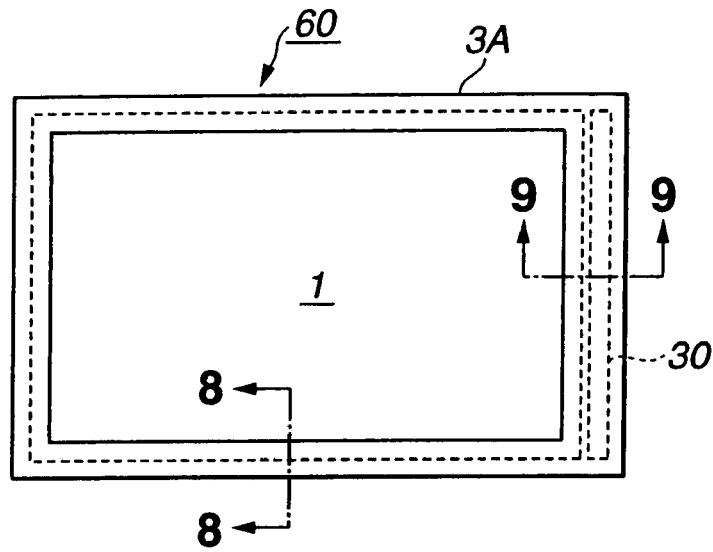
FIG. 7 is a plan view of another exemplary implementation of an optical unit according to the present invention.

FIGS. 5 and 6 illustrate another exemplary implementation of an optical unit 40 according to the present invention. The optical unit 40 is substantially the same as the optical unit 20. However, the optical unit 40 is different from the optical unit 20 in that the antiglare sheet 7 has been eliminated. The optical unit 40 has eliminated the antiglare sheet 7 by using a slightly enlarged diffusion sheet 15. As best seen in FIG. 6, the diffusion sheet 15 covers also the end surface of a frame 2. At an area portion immediately inward of the periphery, the diffusion sheet 15 is fast on the end surface of the frame 2 by adhesive 6.

Elimination of the antiglare sheet 7 has provided a further reduction in thickness in the optical unit 40 as compared to the previously discussed optical unit 20.

FIGS. 7 to 10 illustrate another exemplary implementation of an optical unit 60 according to the present invention.

Before entering the description on the optical unit 60, it is to be remembered that, in the optical unit 20 illustrated in FIGS. 1 and 2, the frame 2, light reflective sheet 3 and antiglare sheet 7 cooperate with each other to form a retainer, which can keep the light conductive plate 1 and the associated optical sheets 4 and 5 in the appropriate positional relationship.

The optical unit 60 is substantially the same as the optical unit 20 in that the retainer keeps the light conductive plate 1 and the associated optical sheets 4 and 5 in the appropriate positional relationship. However, as different from the optical unit 20, a retainer 3A of the optical unit 60 is a single piece made of a light reflective sheet. Accordingly, the optical 60 does not use the frame 2 and the antiglare sheet 7, which are used in the optical unit 20 as constituent elements of the retainer.

Figure 9:
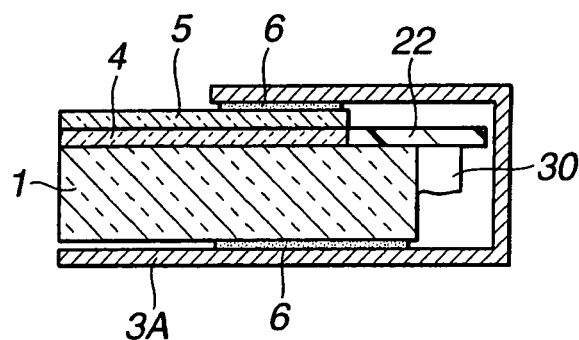
FIG. 9 is a cross section taken through the line 9-9 in FIG. 7.
Figure 10:
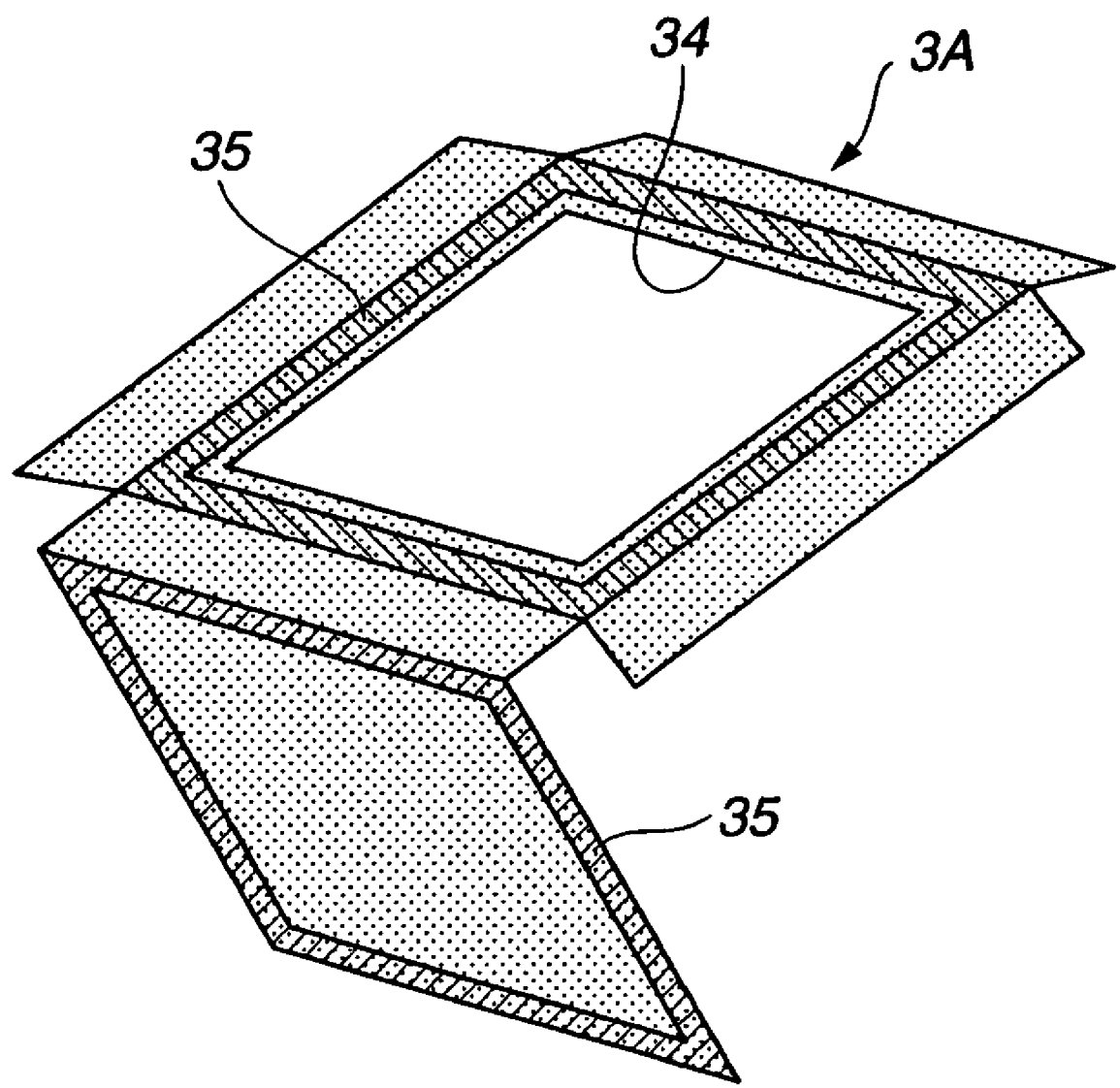
FIG. 10 is an unfolded view of a retainer including a light reflective portion.
Figure 11:
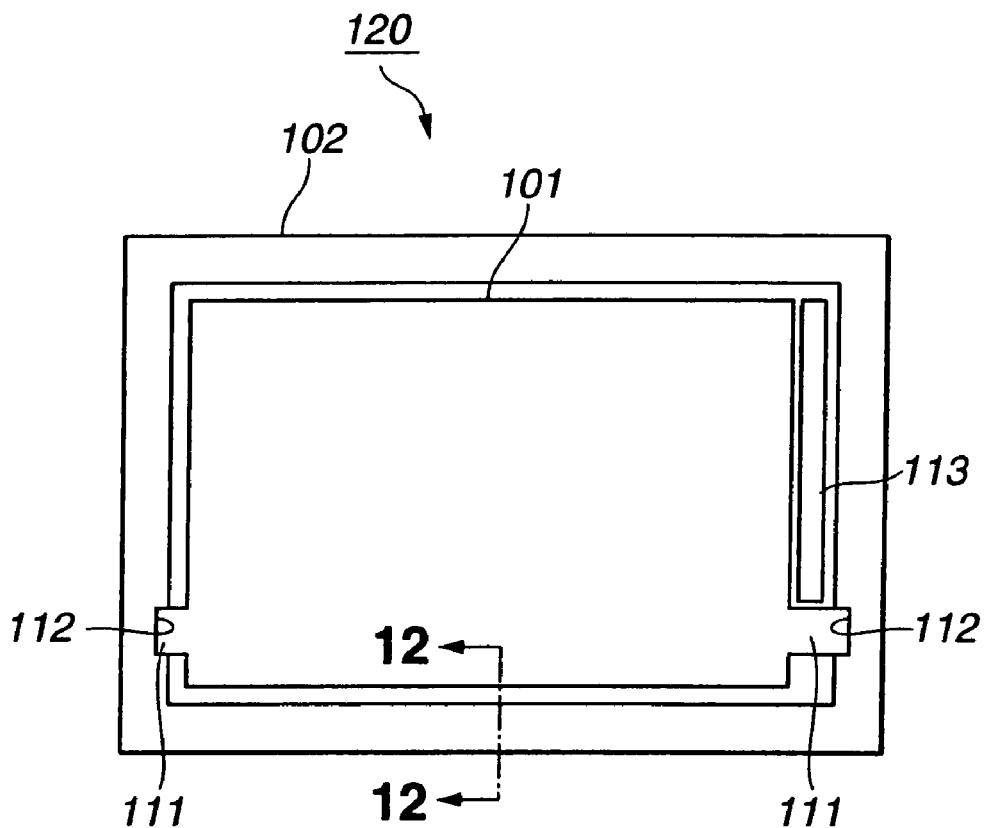
FIG. 11 is a plan view, similar to FIG. 1, of the before discussed optical unit according to the prior art.
Figure 12:
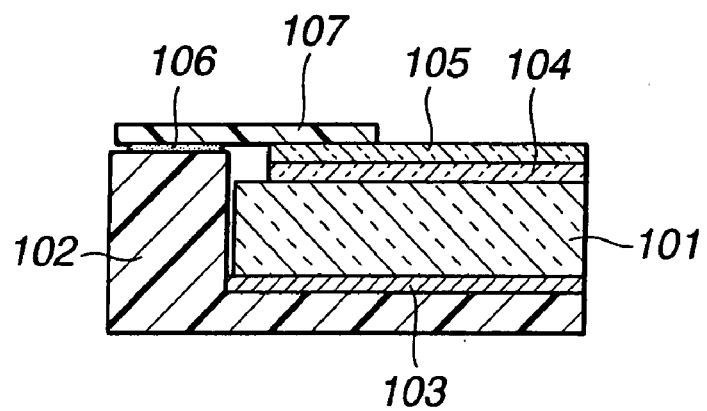
FIG. 12 is a cross section taken through the line 12-12 in FIG. 11.

With reference to FIG. 10, the illustrated shadowed areas 35 indicate one area portion where the retainer 3A is fast on the rear surface of the light conductive plate 1 (see FIGS. 8 and 9) by adhesive 6 and another area portion where the retainer 3A is fast on the surface of the diffusion sheet 5 on the lens sheet 4. The retainer 3A includes an integral rectangular light reflective sheet portion surrounded by the above-mentioned one area portion 35. This rectangular light reflective sheet portion cover the rear surface of the light conductive plate 1 when the retainer 3A is folded and fast on the light conductive plate 1 and the diffusion sheet 5. The retainer 3A is formed with a rectangular opening 34 that is surrounded by the above-mentioned another area portion. This rectangular opening 34 defines a light discharge region on the diffusion sheet 5 over the front surface of the light conductive plate 1.

The following explanation on the manner of assembly may help the reader to understand the advantageous feature of the optical unit 60.

First, attach a fluorescent tube 30 via flexible cable 22 to the light conductive plate 1 near the light receiving edge.

Second, lay the lens sheet 4 over the front surface of the light conductive plate 1.

Third, lay the diffusion sheet 5 over the surface of the lens sheet 4.

Fourth, with the rectangular light reflective sheet portion laid over the rear surface of the light conductive plate 1, fold the retainer 3A in a manner to wrap the light conductive plate 1, fluorescent tube 30 and diffusion sheet 5.

Figure 8:
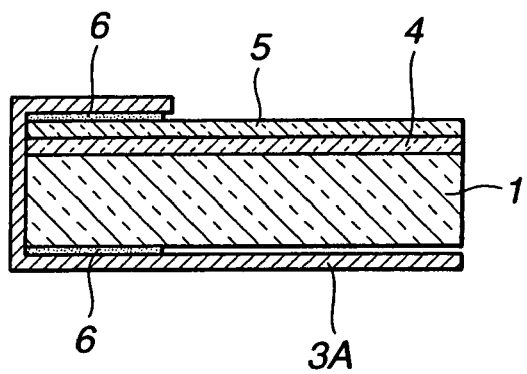
FIG. 8 is a cross section taken through the line 8-8 in FIG. 7.

Fifth, press the retainer 3A along the area portions 35 to fast it on the rear surface of the light conductive plate 1 and on the diffusion sheet 5 via adhesive 6 as shown in FIGS. 8 and 9.

From the preceding description, it is appreciated that the optical unit 60 is advantageous over the optical unit 20 in a reduction of the number of constituent components because the frame 2 is no longer needed.

The optical units 20, 20A, 40 and 60 can be incorporated as a backlight in the usual manner as a component of LCD devices to illuminate LCD.

In one embodiment, a liquid crystal display device comprises a liquid crystal, a pair of substrates having interposed therebetween the liquid crystal, and an optical unit 20 or 20A or 40 or 60 arranged on one side of one of the pair of substrates.

While the present invention has been particularly described, in conjunction with exemplary implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. 2002-057275, filed Mar. 4, 2002, the disclosure of which is hereby incorporated by reference in its entirety.

What is claimed is:

1. An optical unit, comprising:
    a frame surrounding an opening, the frame having a first surface and a second surface, placed directly across from the first surface of the frame;
    a light conductive plate positioned in the opening of the frame, the light conductive plate having a first surface adjacent the first surface of the frame and a second surface adjacent the second surface of the frame;
    a diffusion sheet fastened to the first surface of the frame in a manner to cover at least a portion of the first surface of the frame and to cover the first surface of the light conductive plate; and
    a light reflective sheet fastened to the second surface of the frame in a manner to cover at least a portion of the second surface of the frame and to cover the second surface of the light conductive plate,
    wherein the diffusion sheet and the light reflective sheet cooperate to fasten the light conductive plate within the frame.

2. The optical unit as claimed in claim 1, further comprising:
    a source of light arranged to impinge light onto an edge of the light conductive plate.

3. The optical unit as claimed in claim 1, wherein the light reflective sheet is other than squeezed between the second surface of the frame and the second surface of the light conductive plate.

4. The optical unit as claimed in claim 1, wherein the light reflective sheet covers an entire area of the second surface of the frame.

5. The optical unit as claimed in claim 1, wherein the diffusion sheet covers an entire area of the first surface of the frame.

6. The optical unit as claimed in claim 1, wherein the frame surrounds three sides of the opening.

7. The optical unit as claimed in claim 1, wherein the light conductive plate comprises a projection inserted within said opening.

8. The optical unit as claimed in claim 1, wherein the light conductive plate comprises a projection placed between the first surface of the frame and the second surface of the frame.

9. The optical unit as claimed in claim 1, wherein a lens sheet is squeezed between the diffusion sheet and the first surface of the light conductive plate.

10. The optical unit as claimed in claim 9, wherein the lens sheet covers an entire area of the first surface of the light conductive plate.

11. The optical unit as claimed in claim 1, wherein a pressure-sensitive adhesive double-coated tape fastens the diffusion sheet to the first surface of the frame.

12. The optical unit as claimed in claim 1, wherein the second surface of the frame is other than extending into a portion of the light conductive plate, in a first direction, so that the second surface of the frame overlaps the first surface of the light conductive plate in a second direction, perpendicular to the first direction.

* * * * *